US008758606B2

(12) United States Patent
Tranchant et al.

(10) Patent No.: US 8,758,606 B2
(45) Date of Patent: Jun. 24, 2014

(54) FLUID DISPENSER DEVICE AND A DISPENSING METHOD

(75) Inventors: Jean-Francois Tranchant, Marigny-les-Usages (FR); Marc Chevalier, Franconville (FR); Jacques Gerbron, Menton (FR)

(73) Assignee: L V M H Recherche, Saint Jean de Braye (FR)

( * ) Notice: Subject to any disclaimer, the term of this patent is extended or adjusted under 35 U.S.C. 154(b) by 1184 days.

(21) Appl. No.: 12/112,739

(22) Filed: Apr. 30, 2008

(65) Prior Publication Data

US 2009/0194474 A1 Aug. 6, 2009

(30) Foreign Application Priority Data

Feb. 5, 2008 (FR) ..................................... 08 50738

(51) Int. Cl.
*B01D 29/00* (2006.01)
*C02F 1/32* (2006.01)
*B67D 1/07* (2006.01)

(52) U.S. Cl.
USPC ................. 210/153; 210/748.01; 210/748.14; 210/251; 210/192; 422/22; 422/24; 422/186; 422/186.3; 250/436; 250/455.11; 250/432 R; 250/504 R; 222/192

(58) Field of Classification Search
CPC .................................. B01D 29/00; B67D 1/07
USPC ......... 210/739, 100, 192, 748.01, 748.1, 205, 210/218, 764, 760, 153; 422/24, 186.3, 422/186.07; 250/455.11, 422, 437, 438, 250/436, 432 R, 504 R, 504 H
See application file for complete search history.

(56) References Cited

U.S. PATENT DOCUMENTS

| | | | | |
|---|---|---|---|---|
| 2,867,736 | A * | 1/1959 | Wiswell | 307/141 |
| 5,858,179 | A | 1/1999 | Loda | |
| 7,361,904 | B2 * | 4/2008 | Cassassuce et al. | 250/436 |
| 7,534,356 | B2 * | 5/2009 | Saccomanno | 210/748.11 |
| 2006/0163126 | A1 * | 7/2006 | Maiden | 210/87 |
| 2006/0192137 | A1 * | 8/2006 | Helmore et al. | 250/436 |
| 2006/0289679 | A1 * | 12/2006 | Johnson et al. | 239/333 |

FOREIGN PATENT DOCUMENTS

| | | |
|---|---|---|
| CN | 101088439 A * | 12/2007 |
| FR | 951 117 | 10/1949 |
| GB | 467 924 | 6/1937 |
| GB | 2 398 627 | 8/2004 |
| JP | 2004 351334 | 5/2003 |
| JP | 2005 238180 | 9/2005 |
| WO | WO 99/42376 | 8/1999 |
| WO | WO 2007/134224 | 11/2007 |

* cited by examiner

*Primary Examiner* — Joseph Drodge
*Assistant Examiner* — Cameron J Allen
(74) *Attorney, Agent, or Firm* — Miller, Matthias & Hull LLP

(57) ABSTRACT

A fluid dispenser device including an outlet duct through which fluid can pass, a dispenser that can be actuated so as to cause fluid to be dispensed through said outlet duct, and an irradiation device that is adapted to irradiate the fluid while said fluid is passing through said outlet duct.

14 Claims, 2 Drawing Sheets

FLUID DISPENSER DEVICE AND A DISPENSING METHOD

CROSS-REFERENCE TO RELATED APPLICATIONS

This application claims priority under the Paris Convention to French Patent Application No. 8 50738, filed Feb. 5, 2008.

FIELD OF THE DISCLOSURE

The present invention relates to a dispenser device for dispensing a fluid, and to a method of dispensing such a fluid.

BACKGROUND OF THE DISCLOSURE

Such dispenser devices are known, in particular for dispensing a fluid such as a pharmaceutical composition, a cosmetic composition, or any other composition that is sufficiently fluid to be dispensed through a duct.

SUMMARY OF THE DISCLOSURE

The object of the invention is to provide a dispenser device that makes it possible to modify the properties of the formula of the dispensed fluid. In particular, the dispenser device makes it possible to modify the fluid so as to increase the activity thereof, so as to improve its effectiveness and/or its effect on the skin (e.g. producing a visual effect for makeup).

The fluid dispenser device of the invention includes an outlet duct through which fluid can pass, and a dispenser that can be actuated so as to cause fluid to be dispensed through said outlet duct, and said device further including an irradiation device that is adapted to irradiate the fluid while said fluid is passing through said outlet duct.

Thus, the fluid may be conserved in an inactive form, and be irradiated so as to transform it into an active form just before being used.

In various embodiments of the invention, one or more of the following dispositions may also be used:

- the dispenser device further includes a reservoir that is adapted to contain the fluid to be dispensed, the irradiation device being adapted to irradiate only the fluid passing through said outlet duct, without irradiating the fluid contained in the reservoir;
- the irradiation device is an electrical device;
- the dispenser device further includes:
  - an actuator member that is adapted to cause the fluid to pass through the outlet duct, with a view to dispensing it;
  - an electric power supply device; and
  - an electric control device that can be actuated by the actuator member, and that is adapted to close an electrical circuit between the electric power supply device and the irradiation device when the actuator member is actuated;
- the actuator member is a pushbutton;
- the fluid outlet duct belongs to the pushbutton;
- the electric power supply device comprises a battery that is disposed in the pushbutton;
- the dispenser can be actuated by the pushbutton so as to cause fluid to be dispensed through the outlet duct, said dispenser comprising a main body and a dip tube that is movably mounted on the main body and that is fastened to the pushbutton, the electric control device comprising at least one electric contact secured to the pushbutton, and at least one electric contact secured to the main body;
- the dispenser is a dispenser pump;
- the electric control device further includes:
  - a metal ring that is secured to the main body, and that is coaxial with the dip tube; and
  - two connection tabs, one of the connection tabs being connected to the battery and the other of the connection tabs being connected to the irradiation device, said connection tabs being adapted to come into contact with the ring so as to close the electrical circuit when the actuation member is actuated;
- the irradiation device comprises an electromagnetic-radiation source;
- the electromagnetic-radiation source is a light-emitting diode;
- the electromagnetic-radiation source is disposed in the vicinity of the outlet duct;
- the outlet duct presents an outlet orifice and an opening in the vicinity of the outlet orifice, the electromagnetic-radiation source being disposed so as to irradiate the fluid through the opening; and
- the dispenser device is portable and is actuated manually.

The invention also relates to a method of dispensing a fluid by means of a dispenser device, said method comprising a fluid-dispensing step during which fluid passes through an outlet duct that belongs to the dispenser device. In the invention, fluid is irradiated in the outlet duct during the dispensing step.

Fluid is preferably irradiated just before it leaves the dispenser device, such that, after dispensing, the dispenser device does not include too much activated fluid, thereby avoiding, as much as possible, polluting the inactive fluid that remains in the reservoir. By not irradiating the fluid that remains in the reservoir, said fluid remains in its stable inactive form and may be conserved for a longer period of time.

The fluid preferably includes a substance that can be activated by irradiation, said substance being activated while passing through the outlet duct during the dispensing step. The fluid is preferably irradiated by means of at least one kind of electromagnetic radiation.

BRIEF DESCRIPTION OF THE DRAWINGS

The invention can be better understood on reading the detailed description accompanied by the figures showing an embodiment by way of non-limiting example.

The description refers to the accompanying drawings, in which.

MORE DETAILED DESCRIPTION

Figure 1:
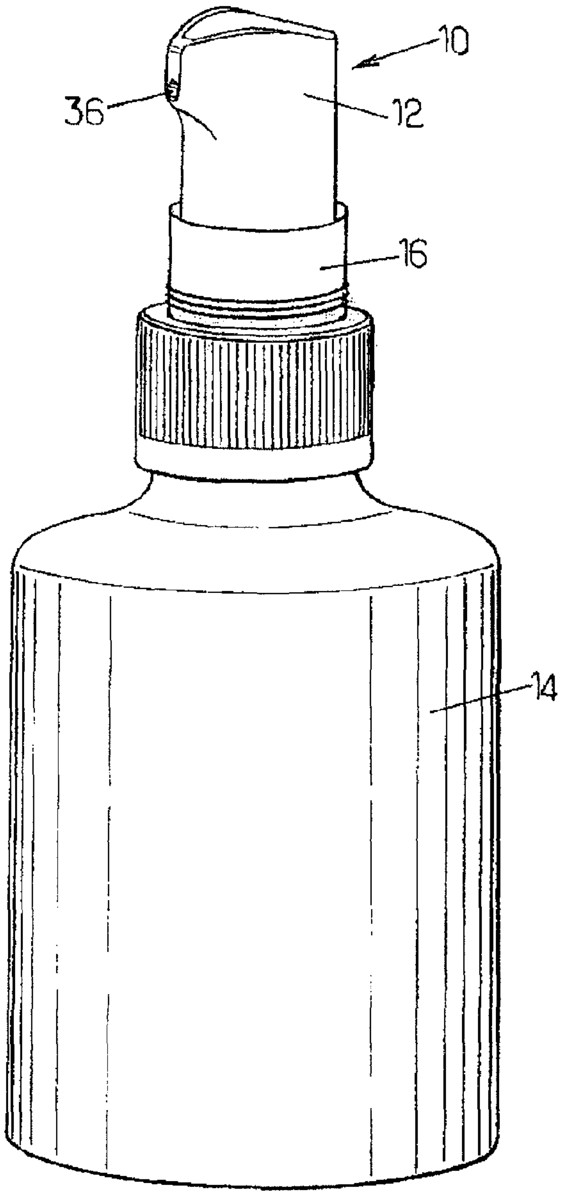
FIG. 1 shows a dispenser device constituting an embodiment of the invention.

FIG. 1 shows a fluid dispenser device 10 comprising a reservoir 14 and an actuator member, specifically a pushbutton 12. The pushbutton 12 is slidably mounted in a collar 16 that is connected in leaktight manner to the reservoir 14 containing a fluid 11 to be dispensed.

The dispenser device 10 further includes a dispenser 18 comprising a main body 20 and a hollow dip tube 22 that is movably mounted on the main body 20 and that is fastened to the pushbutton 12.

The dispenser 18 can be a dispenser pump of known type, optionally including a prestressed spring, or it can be a valve of known type, or any other dispenser means that are suitable for being actuated by a pushbutton and that are adapted to enable a fluid to be dispensed through a duct.

The dispenser device 10 further includes an irradiation device 24 that is preferably an electrical device, and an electric power supply device 26 that enables the irradiation device to be powered so as to irradiate the fluid. By way of example, the electric power supply device comprises a battery 26 that is disposed in the pushbutton 12.

The dispenser device 10 further includes an electric control device 28 that can be actuated by the pushbutton 12, and that is adapted to close an electrical circuit 30 between the battery 26 and the irradiation device 24.

By way of example, the irradiation device 24 comprises an electromagnetic-radiation source that can emit radiation at one or more wavelengths lying in the range ultraviolet to infrared. The radiation can be monochromatic or polychromatic depending on the fluid to be irradiated. Specifically, the electromagnetic-radiation source is a light-emitting diode (LED) 32. In known manner, the color of the LED depends on the wavelength of the selected semi-conductor. In non-limiting manner, the LED 32 envisaged for the invention preferably emits a light (electromagnetic radiation) in infrared (IR) (longer than 700 nanometers (nm)) or ultraviolet (UV) (in the range 200 nm to 400 nm), in such a manner as to irradiate and to activate an activatable substance that is present in the fluid 11 contained in the reservoir 14.

The dispenser device 10 further includes a duct 34 that enables the fluid 11 contained in the reservoir 14 to be dispensed. Specifically, the duct is an outlet duct 34 that is formed in the pushbutton 12.

In order to irradiate only the fluid 11 that is contained in the outlet duct 34 while being dispensed, with said irradiation preferably being performed just before said fluid is expelled from the dispenser device, the LED 32 is preferably disposed in the vicinity of the outlet duct 34. In fact, the outlet duct 34 presents an outlet orifice 36 and an opening 38 that is formed in the outlet duct 34 in the vicinity of the outlet orifice 36. The LED 32 is disposed against the opening 38 so as to be able to irradiate through said opening.

In practice, the LED is included in the pushbutton by overmolding, in particular so as to avoid any sealing problems. Alternatively, a leaktight screen that isolates the fluid from the LED could equally well be provided. In addition, a filter can be disposed between the opening 38 and the LED, in such a manner as to modify the wavelength of the transmitted radiation. When a leaktight screen is provided, said screen can also act as a filter.

While passing through the outlet duct 34, the fluid 11 comes into contact with the LED 32 through the opening 38, in such a manner as to be irradiated only while passing through the outlet duct 34. The LED 32 is disposed in the vicinity of the outlet orifice 36, in such a manner that the fluid 11 is activated just before it is expelled. Thus, substantially all of the fluid 11 that remains in the dispenser 18 and in the pushbutton 12 after actuation is not activated, and therefore remains in stable form.

The electric control device 28 further includes a metal ring 40 that is secured to the main body 20 of the dispenser 18 and that is disposed coaxially around the dip tube 22. Specifically, the ring 40 that is fastened to the main body 20 is mounted rigidly in the collar 16. The metal ring 40 is preferably made of conductive material and is preferably cylindrical in shape.

The electric control device 28 further includes two connection tabs 42A and 42B. The two connection tabs 42A and 42B, that are preferably made of a conductive material, extend substantially longitudinally around the dip tube 22, towards the reservoir 14. By way of example, the connection tab 42A is connected to the battery 26, and the connection tab 42B is connected to a terminal of the irradiation device, specifically to the LED 32; the other terminal of the LED being connected to the battery 26 via another conductor 26A. The connection tabs 42A and 42B are adapted to come into contact with the ring 40, and thus close the electrical circuit 30, as shown diagrammatically in FIGS. 3 and 4.

It should be understood that whenever the pushbutton 12 is actuated, i.e. a user pushes on the pushbutton 12 so as to move it towards the reservoir 14 by sliding it inside the collar 16, the connection tabs 42A and 42B slide with the pushbutton 12 and move towards the ring 40. The ring 40 includes a bottom portion 40A that is fastened rigidly to the main body 20, and a free top portion 40B that is disposed coaxially around the dip tube 22 that extends longitudinally towards the pushbutton 12, away from the reservoir 14.

When the pushbutton 12 is depressed towards the reservoir 14, the connection tabs 42A and 42B move with said pushbutton, and slide, with the plunging head 12, relative to the main body 20, such that said connection tabs 42A and 42B come into resilient contact against the inside face of the free top portion 40B of the ring 40, and slide vertically therealong. Whenever the connection tabs 42A and 42B come into contact with the ring 40, the electrical circuit 30 is closed, enabling the LED 32 to be powered electrically by means of the battery 26. As a result, the LED 32 emits electromagnetic radiation, thereby enabling the fluid 11 to be irradiated through the opening 38 while said fluid is passing through the outlet duct 34, and while it is contained only in said outlet duct.

Figure 3:
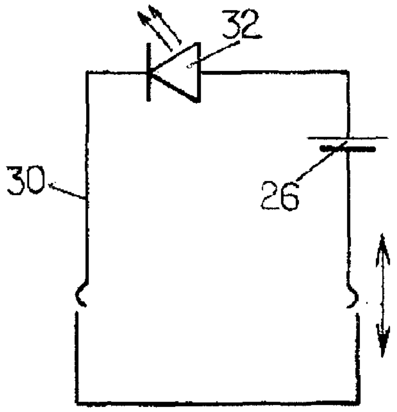
FIG. 3 diagrammatically shows the circuit diagram of the dispenser device, the electrical circuit being open.
Figure 4:
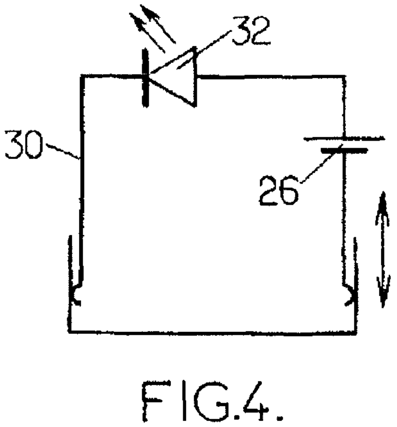
FIG. 4 diagrammatically shows the electrical circuit of the dispenser device, the electrical circuit being closed.
Figure 2:
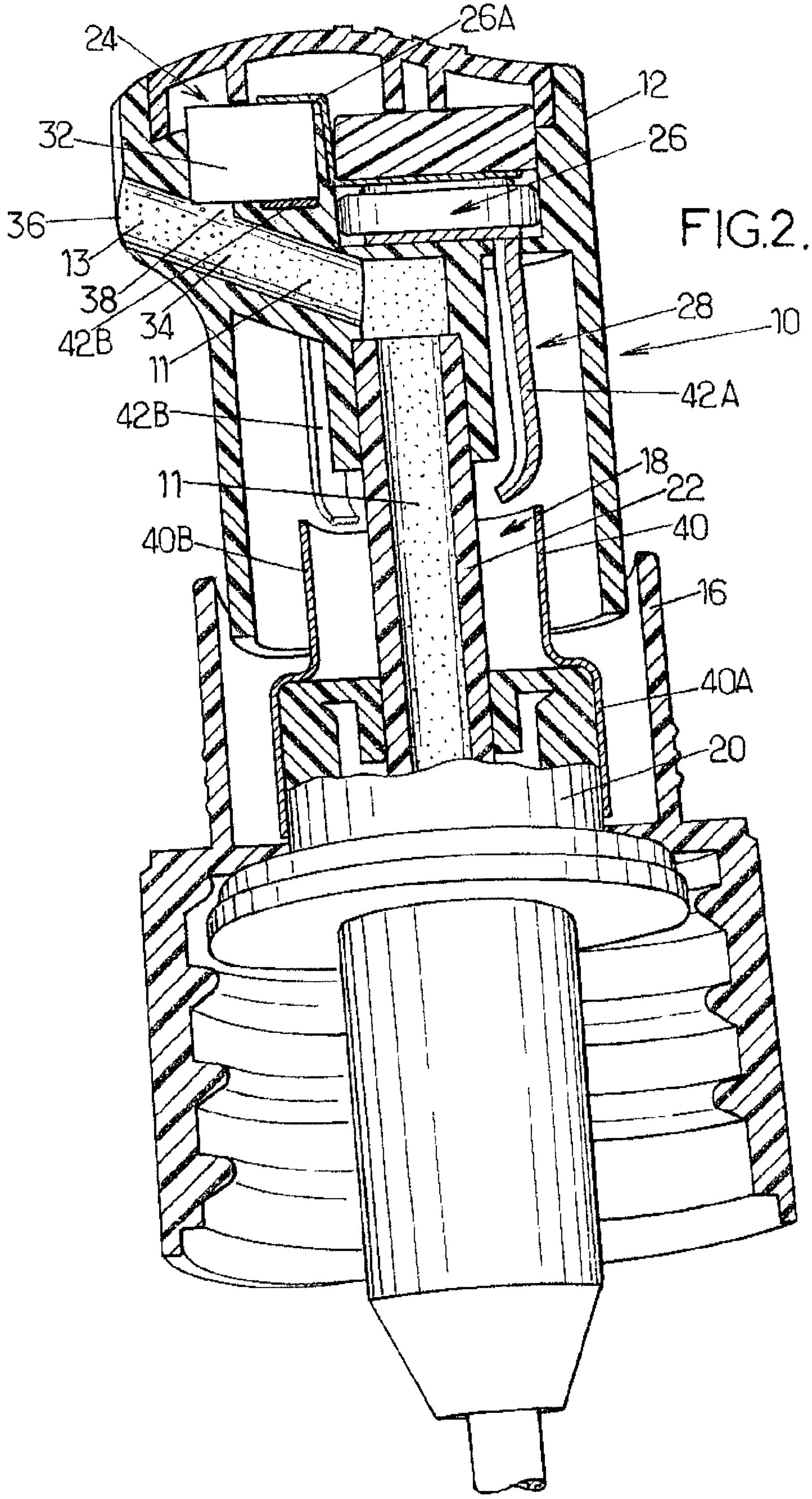
FIG. 2 shows a longitudinal section of the FIG. 1 dispenser device without the reservoir.

With reference to FIGS. 3 and 4, when the pushbutton 12 is not depressed or activated (at a distance from the reservoir 14, corresponding to its rest position), the connection tabs 42A and 42B are spaced apart from the ring 40, and the electrical circuit 30 is open, as shown in FIG. 3. When the pushbutton 12 is activated, the connection tabs 42A and 42B move towards the ring 40 until they come into contact with said ring and thus close the electrical circuit 30, as shown in FIG. 4, enabling an electric current to flow in order to power the LED 32 that can thus emit light radiation. Resilient return means can be provided so that the pushbutton 12 automatically returns to its rest position when it is not activated by the user.

The envisaged fluids 11 can be pharmaceuticals or cosmetic fluids.

By way of example, the envisaged fluids 11 can include active ingredients of biological interest having desired properties that are thus conserved until the fluids are used, since said properties become active under the effect of irradiation.

For an example of an active ingredient of biological interest in cosmetics, mention can be made of (E)-3,4',5-trimethoxystilbene derivative for its antiwrinkle properties in order to prevent and/or combat aging of the skin. In its E (trans) form, this molecule is inactive for the envisaged application, however, in its Z (Cis) form, it presents properties that are similar to the properties of retinoic acid. It is known to pass from the E form to the Z form with the help of UV irradiation lying in the range 200 nm to 400 nm, preferably about 250 nm.

The same applies for cosmetic compositions for makeup that include a substance with pigments such as zinc sulfide.

Phosphorescence (an optical property of zinc sulfide) is revealed by irradiation just at the moment the composition is applied.

Fluids 11 can also contain capsules or carriers that open under the effect of light irradiation, thereby releasing the substance that they contain. By way of example, it is possible to use capsules having a wall that is essentially constituted of marine-origin desoxyribonucleic acid (DNA) that presents the property of opening under the effect of UV irradiation.

Thus, the fluid 11 contained in the reservoir 14 can be conserved for a longer period of time without losing its properties, in particular when it includes active substances that can thus be conserved in inactive form or that can be conserved in protective envelopes such as capsules that can be ruptured by irradiation so as to release the active ingredients that they contain at the moment of application.

The person skilled in the art is well aware of how to associate the type of irradiation with the envisaged application depending on the desired result, namely to activate a given potentially-active substance and/or to release a capsule, acting as a carrier, that is contained in the fluid.

To do this, the person skilled in the art can equip the device of the invention with an irradiation source that is appropriate both in terms of the type of irradiation (monochromatic or polychromatic) that is to be used, and in terms of the electromagnetic-radiation source to be selected depending on whether it emits in the ultraviolet, the infrared, and/or in the visible, and depending on the power required.

What is claimed is:

1. A fluid dispenser device including an outlet duct through which fluid can pass, and a manually powered dispenser that can be manually actuated so as to cause fluid to be dispensed through said outlet duct, said device further including an electrical irradiation device that is adapted to irradiate the portion of fluid passing through said outlet duct while said fluid is passing through said outlet duct, said device further including:

a pushbutton that is adapted to cause the fluid to pass through the outlet duct, with a view to dispensing it;

an electric power supply device; and an electric control device that can be actuated by the pushbutton, and that is adapted to close an electrical circuit between the electric power supply device and the irradiation device when the pushbutton is actuated, the outlet duct being formed in the pushbutton.

2. A dispenser device according to claim 1, further including a reservoir that is adapted to contain the fluid to be dispensed, the irradiation device being adapted to irradiate only the fluid passing through said outlet duct, without irradiating the fluid contained in the reservoir.

3. A dispenser device according to claim 1, in which the electric power supply device comprises a battery that is disposed in the pushbutton.

4. A dispenser device according to claim 1, in which the dispenser can be actuated by the pushbutton so as to cause fluid to be dispensed through the outlet duct, said dispenser comprising a main body and a dip tube that is movably mounted on the main body and that is fastened to the pushbutton, the electric control device including at least one electric contact secured to the pushbutton, and at least one electric contact secured to the main body.

5. A dispenser device according to claim 4, in which the dispenser is a dispenser pump.

6. A dispenser device according to claim 3, in which the dispenser can be actuated by the pushbutton so as to cause fluid to be dispensed through the outlet duct, said dispenser comprising a main body and a dip tube that is movably mounted on the main body and that is fastened to the pushbutton, the electric control device including at least one electric contact secured to the main body, and in which the electric control device further includes:

a metal ring that is secured to the main body, and that is coaxial with the dip tube; and two connection tabs, one of the connection tabs being connected to the battery and the other of the connection tabs being connected to the irradiation device, said connection tabs being adapted to come into contact with the ring so as to close the electrical circuit when the actuation member is actuated.

7. A dispenser device according to claim 1, in which the irradiation device comprises an electromagnetic-radiation source.

8. A dispenser device according to claim 1, in which the electromagnetic-radiation source is a light-emitting diode.

9. A dispenser device according to claim 7, in which the electromagnetic-radiation source is disposed in the vicinity of the outlet duct.

10. A dispenser device according to claim 9, in which the outlet duct presents an outlet orifice and an opening in the vicinity of the outlet orifice, the electromagnetic-radiation source being disposed so as to irradiate the fluid through the opening.

11. A dispenser device according to claim 1, in which the dispenser device is portable and is actuated manually.

12. A method of dispensing a fluid by means of a dispenser device, said method comprising a manually powered and manually operated fluid-dispensing step during which a pushbutton causes fluid to pass through an outlet duct formed in the pushbutton, with a view to dispensing it, and during which the pushbutton actuate an electric control device to close an electrical circuit between an electric power supply device and an irradiation device, wherein the portion of fluid passing through said outlet duct is irradiated by the electrical irradiation device during the dispensing step, wherein the fluid includes a substance that can be activated by irradiation, and, during the dispensing step, said substance is activated while passing through the outlet duct.

13. A dispensing method according to claim 12, in which fluid is irradiated just before it leaves the dispenser device.

14. A dispensing method according to claim 12, in which the fluid is irradiated by means of at least one kind of electromagnetic-radiation.

* * * * *